United States Patent
Balinsky et al.

(10) Patent No.: US 8,689,281 B2
(45) Date of Patent: Apr. 1, 2014

(54) MANAGEMENT OF CONTEXT-AWARE POLICIES

(75) Inventors: Helen Balinsky, Cardiff Wales (GB); Neil Moore, Glasgow (GB); Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 17 days.

(21) Appl. No.: 13/286,095

(22) Filed: Oct. 31, 2011

(65) Prior Publication Data
US 2013/0111544 A1 May 2, 2013

(51) Int. Cl.
*H04L 29/06* (2006.01)
(52) U.S. Cl.
USPC .................. 726/1; 726/4; 726/27; 707/694
(58) Field of Classification Search
USPC .................................................... 726/1
See application file for complete search history.

(56) References Cited

U.S. PATENT DOCUMENTS

| | | | |
|---|---|---|---|
| 6,327,618 B1 * | 12/2001 | Ahlstrom et al. | 709/223 |
| 7,072,956 B2 | 7/2006 | Parupudi et al. | |
| 7,516,475 B1 * | 4/2009 | Chen et al. | 726/1 |
| 8,561,148 B2 * | 10/2013 | Hayton | 726/4 |
| 2006/0048224 A1 * | 3/2006 | Duncan et al. | 726/22 |
| 2008/0256593 A1 * | 10/2008 | Vinberg et al. | 726/1 |
| 2008/0263625 A1 | 10/2008 | Gomez et al. | |
| 2009/0033990 A1 * | 2/2009 | Matsugashita | 358/1.15 |
| 2009/0157620 A1 * | 6/2009 | Kim et al. | 707/3 |
| 2009/0157804 A1 | 6/2009 | McColgan et al. | |
| 2009/0171960 A1 | 7/2009 | Katzir | |
| 2009/0328130 A1 | 12/2009 | Hamilton et al. | |
| 2011/0099603 A1 * | 4/2011 | K. | 726/1 |
| 2012/0131164 A1 * | 5/2012 | Bryan et al. | 709/223 |

OTHER PUBLICATIONS

Agrawal et al., "Policy-Based Management of Networked Computing Systems", Oct. 2005, pp. 69-75.*

* cited by examiner

*Primary Examiner* — Taghi Arani
*Assistant Examiner* — Thaddeus Plecha

(57) ABSTRACT

A method includes obtaining input to modify a policy of a set of context-aware document policies. A policy of the set is applicable to a requested action on a document so as to indicate allowability of the requested action based at least on satisfaction of a condition of the policy that relates to a content of the document. When a plurality of policies of the set are applicable to the requested action on the document, allowability of the requested action is determined by the allowability that is indicated by application of the applicable policy with a highest priority. The modified policy is compared with another policy of the set. If the comparison indicates the modified policy and the other policy are applicable to a single requested action on a single document, the set of policies is automatically ensured to remain self consistent.

16 Claims, 5 Drawing Sheets

MANAGEMENT OF CONTEXT-AWARE POLICIES

BACKGROUND

Recent advances in document creation and management technologies include collaborative creation and editing of documents, automatic repurposing tools, document-centric workflows, and online document sharing. Cloud computing and mobility have merged secure intranets and an insecure Internet making it become more simple for a participant to drag-and-drop protected data into a publicly accessible document, possibly even without realizing it. Thus, document access control based on information about a document alone (document level metadata) may be insufficient to prevent leakage of, or provide for adequate management of, sensitive data. Such document level metadata could fail to transfer to or properly describe such a newly created or modified document.

For this reason, context-aware policies have been developed for document management and access control. Such context-aware policies take into account the actual (run-time) document contents at the moment a document action is about to be executed. Policy conditions of context-aware policies may include document keywords, data patterns, regular expressions, or any combination thereof, or any other condition verifiable on a document and at the same time inherent to a particular type of sensitive data. For example, a document to be exported may be analyzed in light of the context-aware policies, and if a condition of a policy is satisfied, then protective action defined by the policy may be triggered. In this manner, an inadvertent leak of sensitive data may be avoided.

A policy may consist of specification of an action to which it is applicable, a policy condition, and possible policy exceptions. For example, an action to which it is applicable may include transferring a document transferring to a Universal Serial Bus (USB), or sending by e-mail. A single policy may be applicable to more than one action, or a more than one policy may be applicable to the same action. A policy condition may include several conditions combined by operations such as AND, OR, or NOT. Policy exceptions may specify when a policy does not apply. For example, a policy could forbid sending an e-mail containing confidential information to all addresses except internal (e.g. within a company or organization) e-mail addresses.

It is expected that documents that issue from a single source (e.g. a single business or a single template) will have common content, relating to the same subjects and topics. Yet, only some of the documents may contain sensitive content that may be distinguished by conditions of policies. In addition, a natural language may include many ways to express a single concept or subject. Thus, a policy may be made to be sufficiently flexible so as to accommodate potential variations as well as language inflections or spelling errors. Context-aware policy conditions may therefore, incorporate alternatives, negations, and variants.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

DETAILED DESCRIPTION

Figure 1:
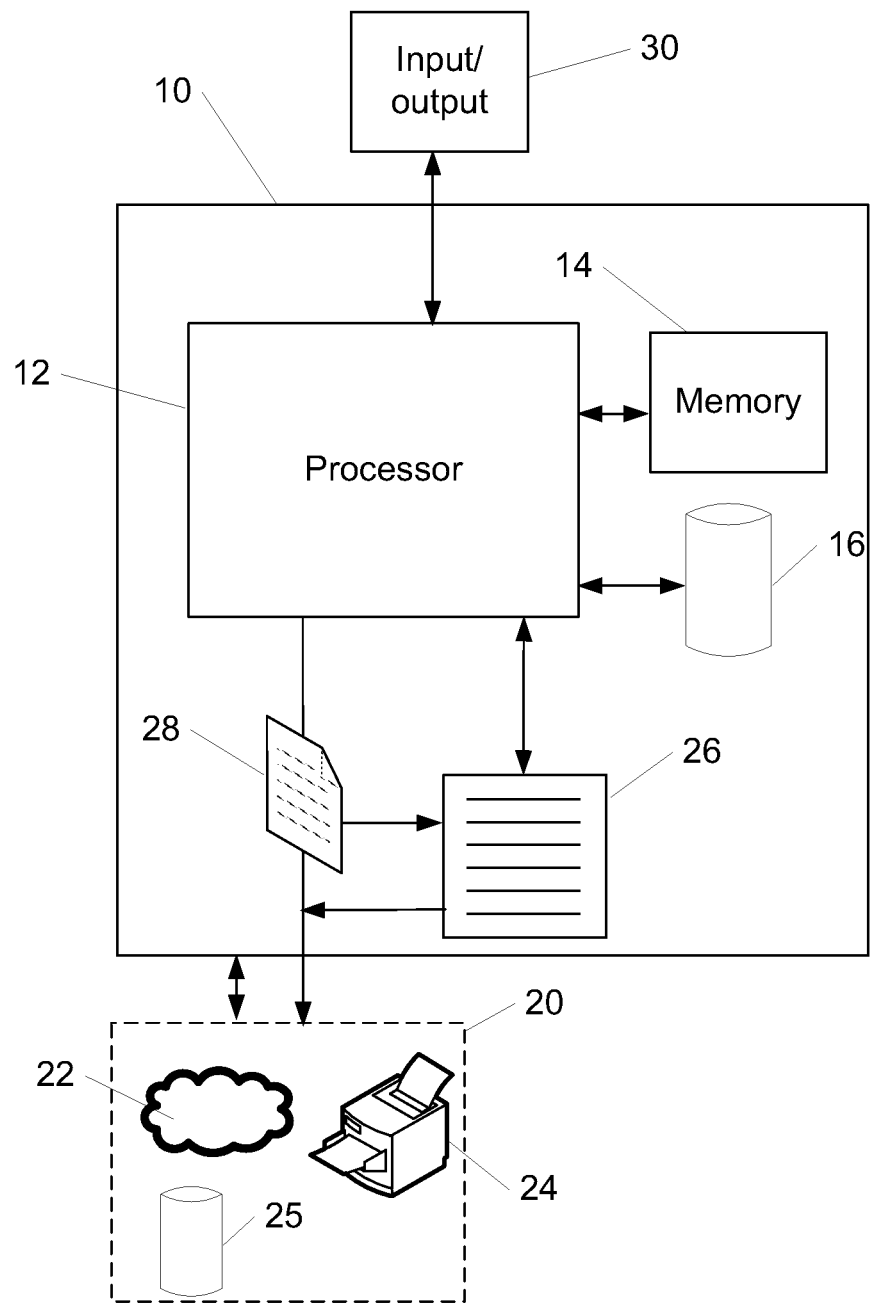
FIG. 1 schematically illustrates an example of a system for management of context-aware policies.

In accordance with an example of management of context-aware policies, allowability of execution of a requested or proposed (e.g. by a user or by an automatic application) action on a document file (herein referred to interchangeably as a document) may be determined by an enforcement mechanism that bases its decision at least partially on a set of context-aware policies. Allowability of the action may include enabling (allowing) the action as requested, enabling the action in modified form (e.g. requiring performance of another action prior to enabling the requested action, or disabling (denying) the action. Other policies that are not context-aware policies may also be applied by the policy decision mechanism.

Allowability may depend on whether or not a condition of a policy is satisfied. Application of a context-aware policy of the set may yield an indicated allowability with regard to the requested action, depending on satisfaction of a condition of that policy. The policy condition may include a plurality of individual sub-conditions, all or some of which need to be satisfied in order for the policy condition to be satisfied. Some or all of the individual sub-conditions may be based on content of the document (e.g. a text tag, a text string, symbol, or other document content). An individual sub-condition of the policy condition may be based on factors other than document content, e.g. document file metadata or document layout structure.

Context-aware policies need not be mutually exclusive (unlike some other types of security policies). For example, the same document may simultaneously contain keywords from two different policies, thus requiring a decision regarding which of the two policies is to be applied to the document. (Although policies may be made mutually exclusive by increasing the complexity of the conditions, it may be difficult for a human policy administrator to effectively comprehend and manage such complex conditions or anticipate the adequacy of the protection.) When application of two or more policies to a single requested action on a single document could indicate in mutually contradictory allowabilities (e.g. application of one policy may indicate enable an action while application of the other may disable the action), a priority may be assigned to each of the policies. Thus, when evaluating execution of an action on a document in light of a set of applicable context-aware policies where application of two or more policies yields mutually contradictory results, allowability of the requested action may be the allowability that is indicated by application of the policy that was assigned the highest priority.

In accordance with an example of management of context-aware policies, the set of policies are maintained such that they remain self consistent. A set of policies is herein considered to be self consistent if application of policies of the set (or a selected subset of relevant policies) to a single requested action on a single document always results in an unambiguously determined allowability (without mutually incompatible, contradictory, or ambiguous results). It may be assumed that the set of policies is initially self consistent, e.g. free of inconsistencies and ambiguities. For example, it may be assumed that the set of policies was initially empty (such that no inconsistency or ambiguity is possible), and that the methods described below (to ensure a self consistent set of policies) had been applied to all subsequent previous additions and other modifications. When the set of policies is to be modified (e.g. when a policy is to be added to the set, deleted from the set, or edited), policies of the set may be examined in light of the modification so as to determine mutual compatibility between pairs of the policies. When an incompatible pair of policies is found (e.g. capable of yielding mutually contradictory results), a priority of at least one of the policies of the pair may be adjusted. Adjustment of policy priorities may include soliciting or receiving input from a user, e.g. in the absence of sufficient information to enable automatic adjustment of the priorities. In addition, an added policy may be compared with other policies of the set for potential overlap or redundancy. For example, if redundancy is detected, a more generally applicable policy may be retained in the set, while a narrower policy may be deleted.

For example, a context-aware policy may determine that a particular action may or may not be performed with regard to a document whose content includes one or more particular text strings. Thus, a computer or processor that is programmed or configured to run in accordance with the set of policies may not be enabled to perform an operation or action with regard to a document file unless that action is enabled in accordance with the policies of the set. Actions with regard to a document that may be enabled or disabled in accordance with context-aware policies may include, for example among other actions, sending (e.g. by email), uploading, editing, printing, copying, deleting, or saving.

A condition of a context-aware policy may also be dependent on factors in addition to content of the document. For example, a dependency on metadata may limit application of a policy regarding printing to a particular printer or set of printers. Similarly, a condition regarding sending an e-mail may limit application of the policy to sending email to a particular email address, set of email addresses, or domain. A condition regarding uploading a file may limit application of the policy to a particular Internet Protocol (IP) address or set of IP addresses, and a condition regarding saving may limit application to a particular save path or set of save paths (e.g. from an original location to an intended destination). In addition, a policy may enable (allow) or disable (deny) an action subject to a limitation or embellishment (e.g. a required concomitant action). Examples of such embellishments may include, for example among others, logging, alerting, encrypting, requesting a formal authorization for the action, signing, or redacting.

An example of management of context-aware policies may assist a policy administrator in modifying a set of policies and in evaluating implications of a modification. For example, when multiple policies apply to a single document, an administrator may be notified of any ambiguities that may be introduced by the modification. The administrator may then be guided to assist in resolving ambiguities, e.g. by being presented with a sequence of choices based on example documents. The results of the administrator's choices may be applied to the policies in the form of assigned priorities.

An example of management of context-aware policies as described herein may enable application of the managed policies so as to enable making a quick and accurate decision when a user attempts to export data. Thus, policies may be evaluated and applied quickly and accurately, e.g. in response to a user-requested action (e.g. pressing a Send button). Until the request and data are analyzed in light of the set of policies, the requested action may be suspended to prevent an undesirable consequence (e.g. leaking data). When application of the set of policies results in a decision, either the originally requested action, an embellished (e.g. by addition of an additional action, such as encryption) action is executed, or the action is denied (e.g. with a message sent to the user who requested the action). A decision regarding the user requested action may be attained in real/run-time, e.g. without the user noticing any delay.

FIG. 1 schematically illustrates an example of a system for managing context-aware policies. Context-aware policy management system 10 may include one or more computers (e.g. connected by a network), or may include one or more modules or applications that may be run on one or more computers. The computers may be incorporated in another system, such as a network server or a document management system. For example, context-aware policy management system 10 may include one or more computers to be operated by a policy administrator (herein referring to a person who interacts with the system in order to create or manage policies), and one or more separate computers to be operated by a user (herein referring to a person who interacts with the system to request actions to be executed on documents, automatically causing application of policies).

Context-aware policy management system 10 includes processor 12 which may operate in accordance with programmed instructions. Processor 12 may communicate with a memory 14. Memory 14 may include one or more volatile or non-volatile memory devices, such as a random access memory (RAM). For example, memory 14 may be used to store programmed instructions or data for operation of processor 12, such as one or more sets of policies 26 or one or more documents 28. Processor 12 may also communicate with data storage device 16. For example, data storage device 16 may include one or more fixed or removable non-volatile devices that may be used for storing data, such as programming instructions for operation of processor 12, one or more sets of policies 26, or one or more documents 28.

Processor 12 may communicate with input/output device 30. Input/output device 30 may include one or more output devices, which may include, for example, a display or an audio output device. For example, an output device of input/output device 30 may be operated to communicate information to a user, administrator, or operator of context-aware policy management system 10. Input/output device 30 may include one or more input devices, such as a keyboard or keypad, a pointing device, touch screen, a video input device, or an audio input device. For example, an input device of input/output device 30 may be operated by a user, administrator, or operator of context-aware policy management system 10 in order to enter an instruction or selection to processor 12.

Processor 12 may communicate with export devices 20. For example, export devices may include a network 22, a printer 24, or a (e.g. non-secure) storage device 25. Processor 12 may be instructed, e.g. via input/output device 30, to perform an action on document 28 that exports document 28 to export devices 20. Policies 26 may be applied to document 28 in accordance with details of the action and of document 28 (e.g. metadata), as well as content of document 28. Application of policies 26 may thus resulted in the action being enable (allowed) or disabled (denied).

A format of a policy may be formally described in terms of Boolean expressions. Each policy may be expressed in the following format:

```
rule ::=proposed_action ∧ metadata ∧ policy_expr →
required_protection
where (examples are given, and other examples are possible):
proposed_action ::= print|email|upload|save
metadata    ::==printer_IP|email_address|upload_IP|save_path;   (each
corresponding to the respective proposed action)
policy_expr ::= policy_condition | (policy_expr ∨ policy_expr) |
    (policy_expr ∧ policy_expr) | (¬ policy_expr)
policy_condition ::= text_tag|regular_expression
required_protection ::= allow [allow_embellishment]
        | deny [deny_embellishment]
allow_embellishment ::= log|encrypt|sign|redact| (other embellishments
are possible);
and
deny_embellishment ::= log|alert| (other embellishments are possible).
```

In the expressions, ::== denotes a definition, ∧ conjunction (and), ∨ disjunction (or), and ¬ negation (not).

In valid rules, the metadata match the proposed action, e.g. for printing, the metadata must be a printer IP address. The policy conditions may be respectively strings of one or more characters or valid regular expressions.

A text_tag or regular_expression may evaluate to true when the corresponding text is found anywhere in the document, or may evaluate to true when found in a particular section of the document (e.g. in a document header, footer, or title). The text_tag may be further augmented by an error tolerance, e.g. to accommodate potential errors in spelling. For example the condition of a policy save ∧ 'technical'$_{Error=}$ ∧ 'report'$_{Error=1}$ →allow may be satisfied when a document contains a misspelled variant of "technical", such as "techical" or "technicl", with an error distance of one character (one missing or superfluous letter).

The meanings of policy_expr correspond to typical meanings in Boolean algebra and policy rules correspond to their Boolean algebra equivalents. For example, whenever proposed_action and metadata match the proposed action on the document, and policy_expr evaluates to true on the document, then a specified required_protection may be applied to the proposed action.

Required protections fall into two broad classes, allow and deny. The protections may include an optional embellishment, such that the protection may be applied along with an additional feature. For example, allow_encrypt may mean that the action is allowed; but that the document is to be encrypted prior to execution of the action. In this example, an encryption interface may be automatically activated to enable the user to complete the action.

An example a single policy:

save ∧ ¬ 'C:\encrypted' ∧ 'classified' →deny may apply only to a proposed action to save a document containing the word "classified" outside the 'C:\encrypted' directory path, in which case the action is denied (disabled). For any other proposed action the policy may be ignored as not applicable. The result of applying such a policy is that any document containing word "classified" can only be saved into the folder "C:\encrypted" and nowhere else on the system; any document that does not contain "classified" can be saved anywhere.

Two policies may be considered to have compatible protections when the resulting required protections are the same, apart from embellishments. Two policies may be considered to have incompatible protections when the resulting required protections are different, apart from embellishments. In the event of incompatible protections, relative priorities may be assigned to each of the two policies with incompatible protections. (The policy with the lower priority may still apply when the only the lower policy, and not the higher priority policy, applies to requested action.)

Since policy_condition evaluates as true whenever, e.g. a corresponding text string is present in the document, it is possible that more than one context-aware policy may apply to a requested action on a single document. In the event that resulting protections from two policies are incompatible, e.g. one allow and the other deny, only the protection that results from the highest priority applicable policy is applied.

For example, in the case that a set of policies is modeled such that it is forbidden to electronically mail (email) any document containing the name of a new product (e.g. product NewModel 5N). However, emailing a document that contains the words "press release" (indicating an explicitly vetted press release) is allowed. When a document contains both "press release" and "NewModel 5N", there is a policy contradiction that may be resolved by assigning relative priorities.

The policies may be expressed as email ∧ 'NewModel 5N' →deny and email ∧ 'press release' →allow, with the latter policy being assigned a higher priority than the former.

Figure 2:
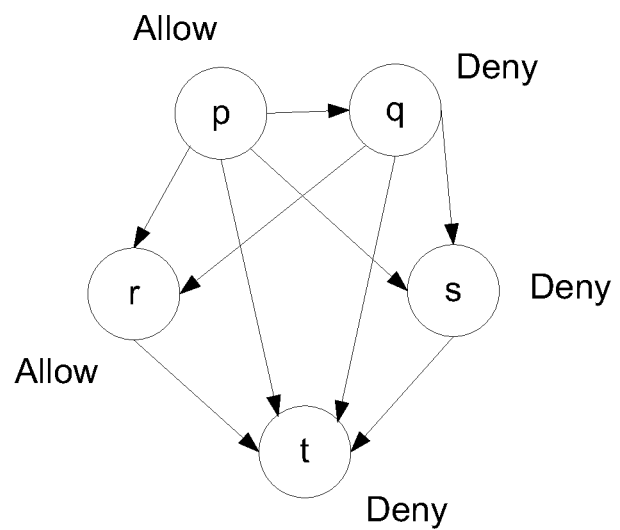
FIG. 2 is a graphical representation of ordering of a set of policies for an example of management of context-aware policies.

Priorities may be assigned to policies may be assigned in order to avoid conflicts when applying multiple polices. For example, pairs of policies may be ordered such that whenever both policies are applicable to a single document, a relative priority may be assigned to each policy. An ordering may be drawn in the form of a directed graph. FIG. 2 is a graphical representation of ordering of a set of policies for an example of management of context-aware policies.

Vertices p, q, r, s, and t in the graph represent policies. The protection that results from application of each of the represented policies (allow or deny) is indicated next to each vertex. A directed path from one vertex to another is indicated by an arrow or series of end-to-end arrows that points from the one vertex to the other. A directed path from a first vertex to a second vertex indicates that policy that is represented by the first vertex has a higher priority than the policy that is represented by the second vertex.

For the sake of efficiency in evaluating multiple policies, it may be desirable to minimize the number of direct paths (each corresponding to a decision that must be made, possibly via policy administrator input).

As an example of management of context-aware policies, priorities may be assigned to policies of a set using a constraint programming implementation of policies. A constraint programming paradigm may be based on separate modeling and solving stages. During a modeling stage, a problem domain is described in terms of constraints and variables. During a solving stage, solutions to the problem domain may be found.

For example, the problem domain may be modeled using Boolean satisfiability (SAT) or in another manner. A SAT problem may consist of a set of variables $V=\{v_1, \ldots, v_j\}$, a set of literals L each of which is either a variable v or its negation ¬ v, and a set of clauses $C=\{c_1, \ldots, c_k\}$, where each clause $c_i$ is a set of literals.

A solution to a SAT problem is a set of literals S such that l∈S ∧ l∉S and also for each clause C, the intersection of C and L is non-empty (in other words, a literal from the solution is found in each clause.

A clause $\{l_1, \ldots, l_j\}$ behaves like a disjunction $l_1 \vee \ldots \vee l_j$ because the solution must contain at least one literal from each clause in order that it be satisfied. The whole SAT behaves like a conjunction $c_1 \wedge \ldots \wedge c_k$ because all clauses must be true for the SAT to be satisfied. When $v \in S$, v may be described as set to true in the solution, and when $\neg v \in S$, v may be described as set to false.

For example, a SAT consisting of variables $\{x, y, z\}$ and clauses $\{\{x, \neg z\}, \{x, z\}, \{\neg y, z\}\}$ corresponds to the Boolean expression $(x \vee \neg z) \wedge (x \vee z) \wedge (\neg y \vee z)$. The set $S = \{x, \neg y, z\}$ is a solution, because each clause has a literal from S in it. This corresponds to setting x=true, y=false, and z=true.

Hence, the modeling stage may consist of generating a SAT problem that describes a security policy and the solving stage may include providing this model to a SAT solver. The attempted action is allowed under the policy if and only if the SAT solver can find a solution. When a SAT solver based on a backtracking search terminates, it has either found a solution or proved that none exists.

In practice, a solution may be found quickly due the intelligence and efficiency of modern solvers, such as the SAT4J Java library for solving SAT and optimization problems.

In modeling security policies as an SAT, each policy may be assigned a priority value. For example, a higher number may be used to indicate a higher priority. For example, assigned priority values may range from 1 to maxprio.

In order to simplify the presentation herein, a policy may be described using a Boolean expressions involving conjunction ($\wedge$), disjunction ($\vee$), implication ($\rightarrow$), and bi-conditional ($\leftrightarrow$), and followed by an equivalence operator ($\equiv$) and a concrete way of writing down the expression as a clause.

Each fragment of a policy (e.g. a part of a policy excluding Boolean operations) may be assigned a Boolean variable that is true if and only if the current document or proposed action matches it. For example, there may be a variable for each word appearing in a policy (e.g., "confidential") and a variable for each proposed action (e.g. "email"). Even if a fragment appears in multiple policies, it is assigned only one variable. For example a policy email $\wedge$ addr=*@gmail.com $\wedge$ 'private' $\rightarrow$ deny may be associated with variables $v_{email}$, $v^*_{@gmail.com}$ and $v_{private}$.

Outcomes allow and deny may be modeled by a variable $v_{allow@i}$ whose value is true if a policy with priority i allows the corresponding proposed action and false if it disallows the proposed action. If, however, a policy with priority i does not yield an outcome of allow or deny, $v_{allow@i}$ may be set to either true or false.

Each policy may be converted into one or more clauses, depending on its complexity. For example, the above example may be converted to $(v_{email} \wedge v^*_{@gmail.com} \wedge v_{private} \rightarrow \neg v_{allow@2})$
$\equiv (\neg v_{email} \vee \neg v^*_{@gmail.com} \vee \neg v_{private} \vee \neg v_{allow@2})$ assuming that it has been assigned a priority value of 2. Hence when the left hand side of the policy evaluates to false (policy does not apply), $v_{allow@2}$ may be either true or false. However, if the policy matches, $v_{allow@2}$ must be set to false or else the clause has no literals in the solution.

In order to eliminate ambiguity that may remain (e.g. a variable $v_{allow@i}$ having a value of false in a solution either because the policy requires that a corresponding action be disallowed, or because the conditions of the policy are do not match the proposed action such that that the value was set to false arbitrarily), a variable $v_{applies@i}$ may be assigned to each priority level i. Variable $v_{applies@i}$ may evaluate to true if and only if a policy with priority i enforces an outcome (e.g. is applicable). This may be modeled by adding a clause of the form LHS of policy $\leftrightarrow v_{applies@i}$ A final variable $v_{allow}$ may be created to indicate whether or not the proposed action is allowed. If no rule of the policy set applies, then $v_{allow}$ may be set to a default result of true (corresponding to allowing the proposed action by default):

$$\bigwedge^i \neg v_{applies@i} \rightarrow v_{allow} \equiv v_{applies@1} \vee K \vee v_{applies@max\ prio} \vee v_{allow}$$

If a policy at priority level i applies, and no higher priority policy applies, the final result may be determined by policies at priority level i:

$$\forall i, v_{applies@i} \wedge \left( \bigwedge_{j=i+1}^{max\ prio} \neg v_{applies@j} \right) \rightarrow v_{allow} \equiv v_{allow@i} 0$$

which may be modeled in terms of clauses for an arbitrary i as $\neg v_{applies@i} \vee v_{applies@i+1} \vee \ldots \vee v_{applies@maxprio}$
$\vee \neg v_{allow@i} \vee v_{allow}$
and
$\neg v_{applies@i} \vee v_{applies@i+1} \vee \ldots \vee v_{applies@maxprio} \vee v_{allow@i}$
$\vee \neg v_{allow}$ The first of these clauses corresponds to $v_{allow}$ being set to true when the policy at level i applies and determines that the proposed action is allowed, while every policy with priority greater than i does not apply. Similarly, The second of these clauses corresponds to $v_{allow}$ being set to false when the policy at level i applies and determines that the proposed action is not allowed, while every policy with priority greater than i does not apply.

The example above, with policies:
email $\wedge$ 'NewModel 5N' $\rightarrow$ deny (priority 1)
and
email $\wedge$ 'press release' $\rightarrow$ allow (priority 2)
may be expressed as clause. The variables used may be $v_{email}$, $v_{NewModel\_5N}$, $v_{press\_release}$, $v_{allow@1}$, $v_{allow@2}$, $v_{applies@1}$, $v_{applies@2}$, and $v_{allow}$. The clauses may include:

$\neg v_{email} \vee \neg v_{NewModel\_5N} \vee \neg v_{allow@1}$
$\neg v_{email} \vee \neg v_{press\_release} \vee v_{allow@2}$
which model the policies;

$\neg v_{email} \vee \neg v_{NewModel\_5N} \vee v_{applies@1}$
$\neg v_{email} \vee \neg v_{press\_release} \vee v_{applies@2}$
$v_{email} \vee \neg v_{applies@1}$
$v_{NewModel\_5N} \vee \neg v_{applies@1}$
$v_{email} \vee \neg v_{applies@2}$
$v_{press\_release} \vee \neg v_{applies@2}$
which ensure that variables $v_{applies@i}$ are set correctly;

$v_{applies@1} \vee v_{applies@2} \vee v_{allow}$
which ensures that when no policy applies, the action is allowed;

$\neg v_{applies@1} \vee v_{applies@2} \vee \neg v_{allow@1} \vee v_{allow}$
$\neg v_{applies@1} \vee v_{applies@2} \vee v_{allow@1} \vee \neg v_{allow}$
which ensure that when only the first policy applies, the overall outcome is determined by the first policy; and $\neg v_{applies@2} \vee \neg v_{allow@2} \vee v_{allow}$
$\neg v_{applies@2} \vee v_{allow@2} \vee \neg v_{allow}$
which ensure that when only the second policy applies, the overall outcome is determined by the second policy.

In accordance with this example, if a user attempts to email a document that contains the text "NewModel 5N" but not "press release", variables $v_{email}$ and $v_{NewModel\_5N}$ may be set to true, while $v_{press\_release}$ may be set to false. The variable $v_{allow}$ is initialized to true so that if the action is allowed a solution may be found, but if the action is not allowed it may be impossible to find a solution. An SAT solver may be instructed to find a solution. Consistency among the clauses requires that $v_{allow}$ has to evaluate to false, in contradiction to the initial value of true which had been assigned. Therefore, no solution is possible, and the action is not allowed.

When applying a set of policies to determine whether or not to enable a proposed action on a document, in accordance with an example of management of context-aware policies, the application may be expedited if not all the policies are loaded into a SAT solver, and if evaluation of some of the conditions may be avoided. For example, if a condition involves searching for the presence of a text string in a very long document, avoiding evaluation of the condition may expedite a decision process. For example, a decision process may be fast enough so as to not appreciably delay execution of an action on a document, e.g. less than 0.25 seconds.

Policies may be loaded one by one, and conditions may be evaluated until the SAT solver is able to prove what protection is to be enforced. In this way, only the policies and conditions that are necessary to get a result may be processed. For example, policies may be preloaded into memory before the procedure begins.

Figure 3:
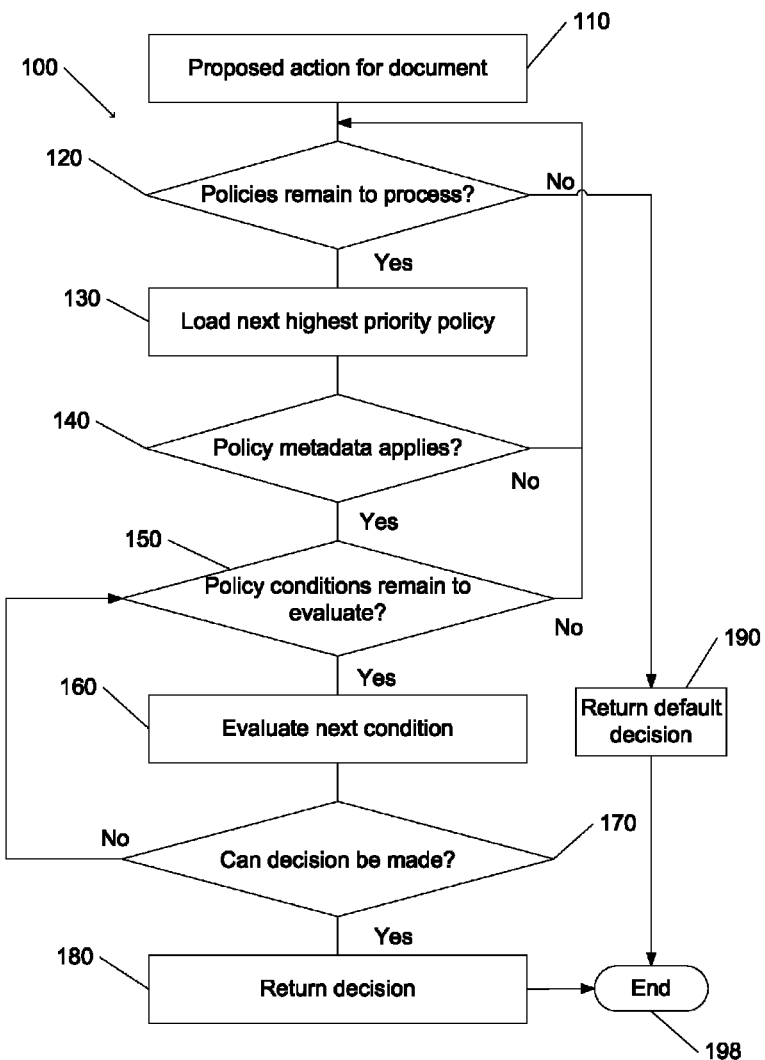
FIG. 3 is a flowchart of an example of a decision process by application of a set of context-aware policies.

FIG. 3 is a flowchart of an example of a decision process by application of a set of context-aware policies. It should be understood with respect to this flowchart and to other flowcharts referred to herein, that the division of a method into discrete operations represented by blocks of the flowchart is for the sake of convenience and clarity only. Alternative divisions of the method into individual operations with equivalent results are possible, and should be understood as representing other examples of the method. Unless indicated otherwise, the order of the blocks in the flowchart has been selected for the sake of convenience and clarity only. Execution of operations that are represented by blocks of the flowchart in a different order or concurrently may yield equivalent results. Such reordering should be understood as representing other examples of the illustrated method.

Policy evaluation method 100 may be executed by a processor of a system for application of context-aware policies, for example, when an action is proposed to be executed with regard to a document (block 110).

If policies, remain to be processed, e.g. applied to the proposed action (block 120), the highest priority remaining policy may be evaluated with respect to the proposed action, e.g. loaded into a SAT solver (block 130). Otherwise, a default decision may be made, e.g. allow the action (block 190), and the process terminated (block 198).

If the policy metadata applies to the proposed action (block 140), and a condition of the policy remains to be evaluated (block 150), the next condition may be evaluated (block 160). Otherwise, the set of policies may be examined to determine if any policies remain to be evaluated (return to block 120).

If upon evaluating the next condition, a decision may be made, e.g. by a SAT solver (block 170), the decision (e.g. to allow or disallow the proposed action) may be returned (block 180) and the process ended (block 198). Otherwise, the policy may be checked to see if a further condition remains to be evaluated (return to block 150).

In accordance with an example of management of context-aware policies, a policy administrator may be assisted in defining policies such that redundant policies (e.g. existence of a policy that can be removed or ignored without changing the protection with regard to any action) may be avoided. For example, a policy may be considered redundant if there is another policy that is applicable to the same requested action, the policy condition of that other policy covers the same or a wider class of documents, and satisfaction of the conditions of both policies results in identical allowances. Avoidance of redundant policies may expedite policy decisions when evaluating an allowance of a requested action, may minimize the set of maintained policies, and may eliminate unnecessary effort on the part of a policy administrator. Consequences of adding, editing, or deleting a policy may be made apparent to the policy administrator. Misunderstanding such consequences could result in introducing unintended results that could result in unintentionally leaking data or in making a desired and permissible business process impossible to complete. A policy administrator may be assisted in assigning priorities and in comprehending consequences of modifications to the policies so as to achieve desired results when applied.

Such assistance may be referred to collectively as a modeling assistant. Thus, a policy administrator may be assisted in performing actions to add, edit, or remove a policy from the policy set. For example, a policy administrator may be restricted to performing a single operation at any one time. This may avoid concurrent creation of policies with incompatible protections and unpredictable side-effects.

Operation of a modeling assistant may include summarizing effects of policies both individually and in groups.

For example, for a particular policy p, it may be useful to generate pertinent and exhaustive (all distinct) examples of actions, metadata, and documents, as well as the protection that application of p enforces on those documents. An example may be considered pertinent if it includes key words or text strings that appear in appropriate fields of the policy. An example may be considered exhaustive if it relates to all classes of documents to which the policy applies (but not every document because they could be infinite in number).

For example, in the case of a policy:

email $\wedge$ ('private' $\vee$ 'confidential') $\rightarrow$ allow pertinent words are "private" and "confidential". Since the condition is a disjunction, the policy applies if either "private" or "confidential" or both occur in the document. When the policy applies, the outcome is allow. Thus the policy applies to three pertinent classes of document, containing either "private", "confidential", or "private" and "confidential". Thus, emailing any document that contains the word "private", including documents containing the strings such as "private parking" or "private property" (which may not indicate to a reader of the document that the contents of the document are to be kept private), would be allowed.

As another example, it may be useful to generate pertinent and exhaustive examples for a pair of policies p and q. The examples may illustrate implications of assigning relative priorities to p and q and effects of applying the two policies in combination, and effects of changing a policy.

For example, for the pair of policies:

email $\wedge$ 'NewModel' $\wedge$ '5N' $\rightarrow$ deny with priority 1, and email $\wedge$ ('declassified' $\vee$ 'press release') $\rightarrow$ allow with priority 2, the pertinent words are "NewModel", "5N", "declassified", and "press release". The first policy may apply alone only to a document containing both "NewModel" and "5N", with the result deny. There are three examples of both policies applying (containing "NewModel" and "5N", as well as one or both of "declassified", and "press release") with the result allow. There are another three examples of only the second policy applying (containing one or both of "declassified", and "press release"), with the result allow.

As yet another example, it may be useful to generate pertinent and exhaustive examples that illustrate effects of applying a policy p, and applying an edited version p' of the same policy.

As described above, policies may be implemented by modeling them with constraints. Outcomes for a pair of policies may be enumerated by posting them as described and instructing a SAT solver to generate all solutions such that a policy applies. An example may be generated for each solution by finding all variables that represent policy conditions and that have been set to true in the solution. An example document must contain the corresponding terms or strings. Metadata whose corresponding variables have been set to true may indicate to which metadata, e.g. which save path or which email recipients, the example is pertinent. The value of $v_{allow}$ may be checked to determine whether the proposed action is allowed (true) or denied (false) by that pair of policies. Such an implementation may be entirely decoupled from the meaning of policies, provided that the policy has been modeled as SAT clauses. Such an enumeration routine may simply request all solutions and interpret them. An alternative approach may require some care to ensure that all examples were found and that the semantics of policies were taken into account even in the presence of complex conditions including arbitrary Boolean operations.

An example of a system for management of context-aware policies may include a policy editor interface. A policy administrator interacting with the policy editor interface may edit policies and assign priorities to the policies. A policy assistant application or module may also interact with a policy administrator via the policy editor interface.

For example, a policy editor interface may display the policies in the form of a table, with the policies ordered in order of their priorities (e.g. from highest to lowest priority). The ordering in the table may be equivalent to a preorder traversal of the priority graph (e.g. as in FIG. 2). In such an ordering, whenever a there is a path in the priority graph from policy p to policy q, policy p must appear earlier in the list than policy q.

Figure 4:
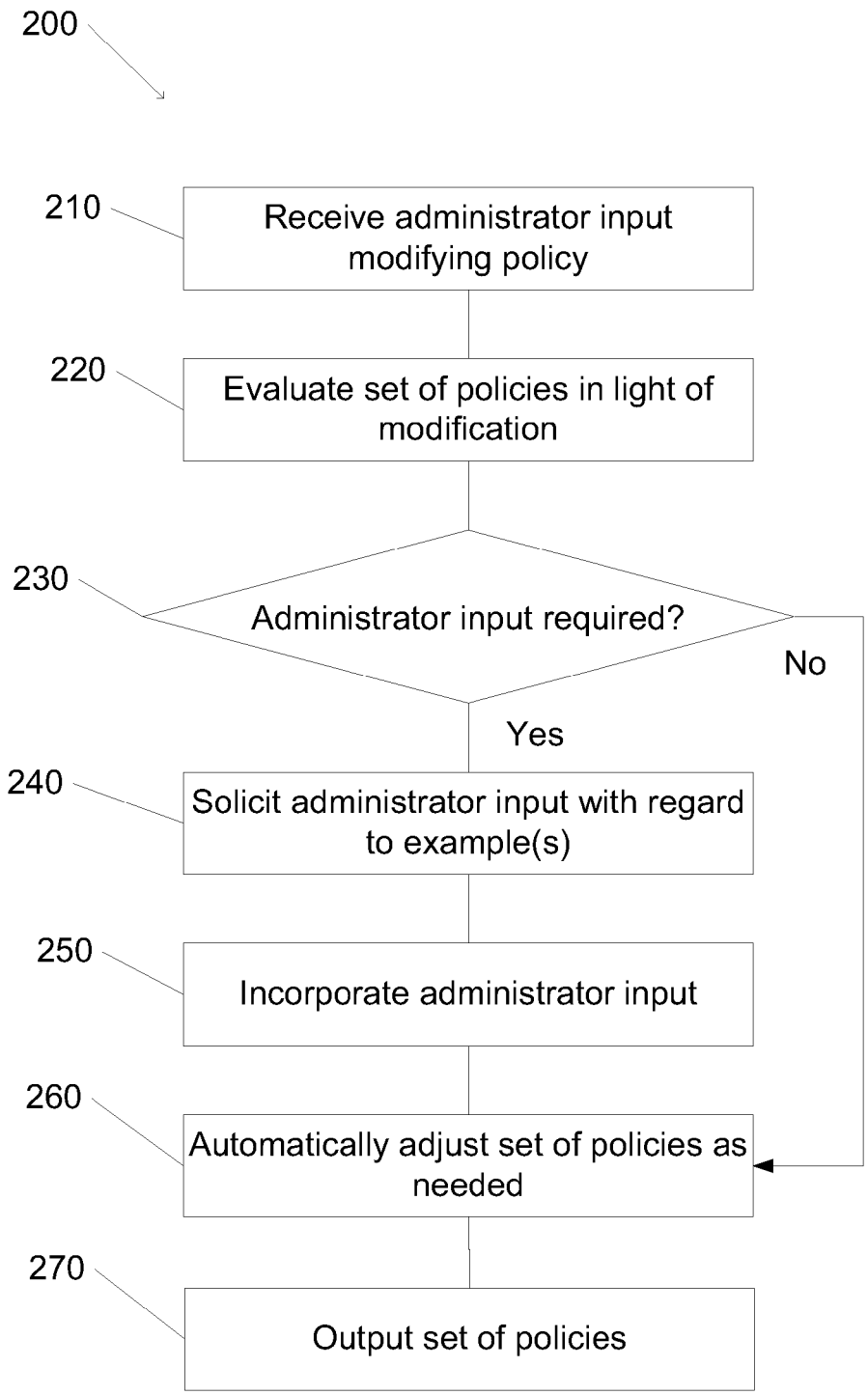
FIG. 4 is a flowchart of an example of a method to manage a set of context-aware policies.

FIG. 4 is a flowchart of an example of a method to manage a set of context-aware policies. Policy set management method 200 may be executed, for example, by a processor of a system for managing context-aware policies.

Policy set management method 200 may be executed when a policy administrator indicates (e.g. by operating an input device, e.g. in connection with a user interface to a processor) of an intention to modify (herein understood as including creating) a set of context-aware policies.

For example, a policy administrator may input to a processor a modification (such as, for example, addition, deletion, or editing) of a policy of a set of context-aware policies (block 210). The set of policies may be examined in light of the modification (block 220). For example, the set of policies may be examined for overlapping function among policies, or for redundancies or potential contradictions among the policies of the set. Effects of applying the set of policies after the modification may be compared to effects of applying the set of policies prior to the modification.

In some cases, input from the policy administrator may be required (block 230). One or more examples of documents to which the set of context-aware policies apply may be generated. The examples and possible outcomes of application of the set of context-aware policies to each example may be presented to the policy administrator (e.g. displayed on a display screen or monitor), and policy administrator input solicited (block 240). For example, an example and one or more possible results of application of the policies to the example may be displayed in an appropriate tabular or other form.

For example, a modification may affect the results of applying the set of policies to a document with a particular content. An example of the particular content (e.g. a minimal document that consists entirely of keywords relevant to application of the policies) may then be presented to the policy administrator together with an indication of a result of the modification. Input from the policy administrator may then be solicited that either accepts or rejects the modification.

As another example, application of two policies of the modified set to a document with a particular content may yield mutually incompatible or contradictory results (e.g. application to a document that contains key words that are relevant to two policies that yield contradictory results with regard to allowing or disallowing a proposed action). An example document that consists of the particular content may then be generated. Input from the policy administrator may be solicited to indicate which result is to apply (e.g. allow or block the relevant proposed action).

The policy administrator input may be incorporated into the set of policies with regard to the modification (block 250). For example, if the policy administrator indicates rejection of a modification, the modification may be ignored and the set of policies left as before the modification. If the policy administrator indicates acceptance, the modified policy may be incorporated into the set of policies. In the case of incompatible results from application of two policies to a single document, policy administrator input may incorporated in the form of a modification of a priority that is assigned to one or both of the two policies.

If needed, automatic adjustments may be performed to the set of policies (block 260). For example, if a policy is redundant, the redundant policy may be deleted.

After incorporating any policy administrator provided input or automatic adjustments, the set of policies may be output (block 270). For example, the set of policies may be stored in a memory or data storage device for use by a processor in determining whether or not a proposed action on a document may be allowed (enabled) or disallowed (disabled). The set of policies may be utilized by a policy enforcement mechanism or system.

For example, a policy editor interface and a policy assistant application may include an add policy function. For example, an "add policy" function may be implemented as a wizard that presents a policy administrator with a series of choices. As a result of the policy administrator's selection, the application may determine what the added policy is, how it should interact with other policies, and whether the set of policies (or policy database) can be simplified by removing a newly redundant policy. However, changes to the set of policies may not be finalized until interaction with the application has been completed. Thus, the application may be used for exploratory modeling of policies.

Figure 5:
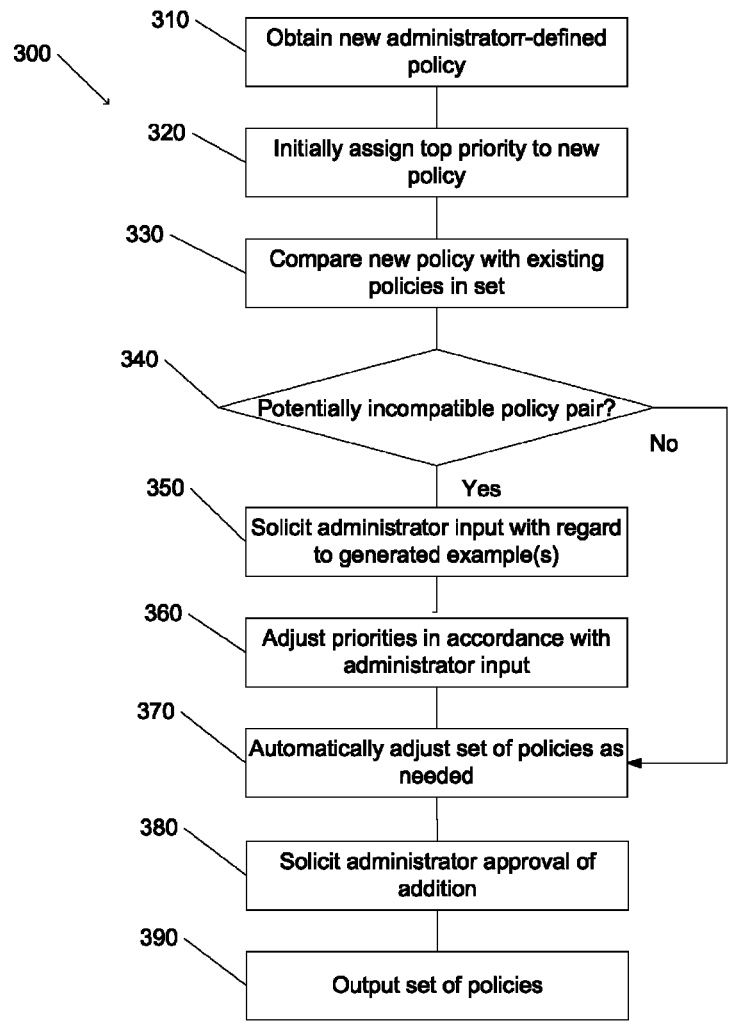
FIG. 5 is a flowchart of an example of a method for adding a policy to a set of context-aware policies.

FIG. 5 is a flowchart of an example of a method for managing adding of a policy to a set of context-aware policies. Policy addition method 300 may be performed when a policy administrator indicates an intention to add a context-aware policy to a set of context-aware policies.

Input from a policy administrator may define a new policy p to be added to a set of policies (block 310). For example, a user interface may be provided that enables a policy administrator to select or input an action, metadata, conditions, and protection that define a policy.

For purpose of evaluation, the new policy may be initially assigned a top priority (block 320).

The new policy may be compared with existing policies in the set (if any, block 330). For example, the new policy may be checked against any existing policies one at a time for redundancy or potential contradiction.

If application of a pair of policies to a document with particular content may yield potentially mutually contradictory outcomes (e.g. allow or disallow a proposed action) for a document, policy administrator input may be required (block 340). An example that illustrates the possible outcomes may be generated and presented to the policy administrator for input (block 350). For example, two possible outcomes may be presented to the policy administrator, with the policy administrator required to select one. The priority of one of the pair of policies may be adjusted In accordance with policy administrator input (360). For example, a priority of the policy whose application yields the outcome selected by the policy administrator may be assigned a priority that is higher than the other policy of the pair. The process may continue until it is determined that all such pairs have been resolved. In addition, automatic adjustment of the set of policies, such as removal of a redundant policy, may be performed (block 370). The policy administrator may be informed prior to such removal and may be asked to approve, verify, or ratify the automatic decision. Since policy redundancy could result from a policy being added or modified mistakenly, informing the policy administrator of the redundancy may enable the policy administrator to notice and correct the error.

Finally, if the new policy has not been removed (e.g. as redundant), policy administrator approval of the addition may be solicited (block 380). For example, the policy administrator may be presented with a generated example that illustrates the effects of the addition. At this point the policy administrator may approve or reject the addition. The set of policies, either including or not including the newly added policy, may then be output.

For example, to illustrate execution of the operations that are represented by block 330 through block 370, consider a new policy p, and assigned a priority (initially top priority). The existing current policy cp may represent a policy of the set with the next lowest priority after that of p.

If the current priority of p is the lowest priority, no more comparisons need be made.

If protections of p and cp are the same (e.g. allow or disallow) but the condition of cp is a more general than that of p (e.g. cp applies to every proposed action that p applies to), p may be automatically discarded as redundant.

On the other hand, if the conditions of p are more general than those of cp, policy cp may be deleted as redundant. Policy p then replaces cp. Comparison of p with policies of lower priority than the deleted cp may continue.

If cp and p have compatible protections (e.g. both allow or disallow) or do not apply to a single proposed action, no priorities need be examined or modified. Comparison of p with policies of lower priority than the deleted cp may continue.

If the protections of p and cp are incompatible and the conditions match exactly the same documents (e.g. one allows and the other disallows an action under all of the same conditions), the policy administrator may be asked to select one of the policies. For example, such a situation may result from a policy administrator error (e.g. mistake in input). In this case, the policy administrator may indicate canceling of the addition, or may reedit the new policy.

If the protections of p and cp are incompatible but the condition of cp is more general than the condition of p, p may be left with its current priority and the comparison may terminate (no other policies need be compared with p). Thus if the condition of p is satisfied but not the more general condition of cp, the protection of p may be applied. (Were the priority of p to be less than that of cp, policy p would never be applied, a situation that may be referred to as "shadowing".)

In all other cases of incompatible protections, an example may be generated and presented to the policy administrator. The example may illustrate the difference in outcome depending on which of policies p and cp is assigned the higher priority. The policy administrator may then select one of the outcomes. If the outcome of applying policy cp is selected, priorities assigned to p and cp may be interchanged. Comparison of p with policies of lower priority than the currently assigned priority of p may continue. On the other hand, if the outcome of applying policy p is selected, no further comparison is needed with policies having priorities that are lower than that of policy cp (priority path relations being transitive).

When soliciting policy administrator approval for that addition (as in block 380), a final summary may be presented to the policy administrator. The summary may present generated pertinent and exhaustive examples of what happens when p and each policy with priority lower than p apply together. (The policy administrator had previously been presented with examples that illustrate concurrent application of p and policies with priorities higher than that of p when necessary.)

For example, consider a set of policies that include two existing policies, a higher priority policy $cp_1$:

save $\wedge$ technical $\wedge$ report→allow and a lower priority policy $cp_2$:

save $\wedge$ NewModel $\wedge$ 5N→deny.

These policies together mean that technical reports may be saved but that documents containing the name of a new product "NewModel 5N" cannot be saved. If the policy administrator wishes to add a special case that press releases should also be allowed, a policy p may be added:

save $\wedge$ press $\wedge$ release→allow

No comparison of p with $cp_1$ is necessary, as both policies have the same protection and their relative is order is unimportant. However the policy administrator may be requested to select relative priorities p with $cp_2$. For example, a screen may display an example document containing the words "NewModel", "5N", "press", and "release" with two possible outcomes, allow and deny. If the policy administrator selects allow, policy p is assigned a higher priority than policy $cp_2$.

As another example of managing a set of context-aware policies, a policy of a set of context-aware policies may be removed or deleted.

Application of a remaining policy with the same protection as p may be unaffected by removal of p since even when both apply, the outcome is unchanged. Similarly, application of a remaining policy with a higher priority than p may be unaffected by removal of p since that policy overrides p.

Application of a remaining policy q with a protection incompatible with p and with lower priority may be affected with regard to a document to which both p and q apply. Pertinent and exhaustive examples of actions whose protections differ before and after removal of p may be generated for each such policy q. The policy administrator may be requested to approve or reject removal of p in light of the examples.

For example, consider a set of policies listed in descending order of priority: save $\wedge$ technical $\wedge$ report→allow, save $\wedge$ press $\wedge$ release→allow, and save $\wedge$ NewModel $\wedge$ 5N→deny. Removal of the first policy may not affect the second policy, since they both have the same protection. However, application of the third policy to a document containing both "technical report" and "NewModel 5N" is affected. Saving such a document was allowed prior to removal of the first policy, and is not allowed afterward. For example, the policy administrator may be presented with an example of saving a document that contains both "technical report" and "NewModel 5N", with the outcome being displayed as blocked. The policy administrator may indicate approval (e.g. by selecting an appropriate screen control, e.g. labeled "Finish") or rejection (e.g. by selecting a screen control labeled "Cancel").

As another example of managing a set of context-aware policies, a policy of a set of context-aware policies may be edited. Editing a policy may be decomposed into separate operations of deletion of the existing policy followed by addition of the edited policy.

Thus, a policy administrator may interact with a user interface that enables editing a policy. Examples may be generated that both illustrate the effects of the policy before and after editing. These examples may be presented to the policy administrator for approval or rejection. In addition, examples may be generated illustrating effects on documents of assigning various priorities to pairs of mutually contradictory policy outcomes. The policy administrator may indicate the preferred outcome.

For example, a policy administrator may correct an existing policy save∧techical∧report→allow that includes a spelling error. The policy administrator may edit the policy to correct to: save∧technical∧report→allow. An example in this case may include showing a generated document containing a string "techical report" as being allowed by the policy prior to editing. Another example may include showing a generated document containing a string "technical report" as being allowed by the policy after editing. The policy administrator may then approve or reject the change.

A SAT solver may be used to implement features of an assistant (e.g. wizard) for assisting in adding, removing, and editing policies. For example, a SAT solver may be used to determine whether a policy p has a more general, more specific, or equal condition as compared to another policy q. A SAT solver may implement this functionality.

For example, in order to show that p is at least as general as q, an SAT solver may be instructed to find a counterexample (e.g. a document to which q applies but p does not). This may involve posting both p and q as clauses with variables $v_{p\text{-applies}}$ and $v_{q\text{-applies}}$ that represent whether p and q apply, respectively. If the SAT solver cannot find a solution with $v_{p\text{-applies}}$ set to false and $v_{q\text{-applies}}$ set to true, p may have been proved to be at least as general as q.

In order to show that p is at least as specific as q, q may be proved to be at least as general as p as described above. In order to show that p has the same condition as q, p may be proved to be at least as general as q, and q at least as general as p.

In accordance with examples of management of context-aware policies, a computer program application stored in non-volatile memory or computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein, such as an example of a method for management of context-aware policies.

The computer-readable medium may be a non-transitory computer-readable media including all forms and types of memory and all computer-readable media except for a transitory, propagating signal. In one implementation, external memory may be the non-volatile memory or computer-readable medium.

We claim:

1. A method comprising:
obtaining input to modify a policy of a set of context-aware document policies, the policy of the set being applicable to a requested action on a document so as to indicate allowability of the requested action based at least on satisfaction of a condition of the policy that relates to a content of the document, and when a plurality of policies of the set are applicable to the requested action on the document, allowability of the requested action being determined by allowability that is indicated by application of the applicable policy with a highest priority;
modifying the policy based on the input and comparing the modified policy with an other policy of the set;
in response to a determination that the comparison indicates the modified policy and the other policy are applicable to a single requested action on a single document, automatically ensuring that the set of policies remains self-consistent,
wherein automatically ensuring that the set of policies remains self-consistent comprises:
generating an example of performance of the single requested action on an example of a document; and
in response to a determination that the comparison indicates mutually contradictory allowability, ensuring that different priorities are assigned to the modified policy and the other policy by:
receiving a user input that indicates a preferred allowability based on the example of performance; and
assigning a higher priority to either the modified policy or the other policy based on the user input.

2. The method of claim 1, wherein automatically ensuring that the set of policies remains self-consistent further comprises
ensuring that either the modified policy or the other policy is deleted from the set if the comparison indicates that the modified policy or the other policy is redundant.

3. The method of claim 2, wherein ensuring that either the modified policy or the other policy is deleted from the set comprises automatically deleting whichever of the modified policy and the other policy includes a condition that is less general.

4. The method of claim 1, wherein the input comprises an indication to add a policy to the set, to delete a policy from the set, or to edit a policy of the set.

5. The method of claim 1, wherein comparing the modified policy and the other policy comprises calculating Boolean satisfiability for the modified policy and the other policy expressed as Boolean clauses.

6. The method of claim 1, wherein the requested action is selected from a group of actions consisting of: printing, saving, emailing, and uploading.

7. The method of claim 6, wherein the requested action comprises metadata including a printer address, an email address, an upload address, or a save path.

8. The method of claim 1, wherein the condition comprises inclusion of a character string within the document.

9. The method of claim 1, wherein generating the example of performance comprises:
automatically generating another document;
applying the set of policies to the another document; and
outputting the another document and an outcome of the application of the set of policies to the another document.

10. A non-transitory computer readable medium having stored thereon instructions that when executed by a processor cause the processor to:
 obtain input to modify a policy of a set of context-aware document policies, the policy of the set being applicable to a requested action on a document so as to indicate allowability of the requested action based at least on satisfaction of a condition of the policy that relates to a content of the document, and when a plurality of policies of the set are applicable to the requested action on the document, allowability of the requested action being determined by allowability that is indicated by application of the applicable policy with a highest priority;
 modify the policy based on the input and compare the modified policy with an other policy of the set;
 in response to a determination that the comparison indicates the modified policy and the other policy are applicable to a single requested action on a single document, automatically ensure that the set of policies remains self-consistent,
 wherein to automatically ensure that the set of policies remains self-consistent includes to:
  automatically generate an example of performance of the single requested action on an example of a document; and
  in response to a determination that the comparison indicates mutually contradictory allowability, ensure that different priorities are assigned to the modified policy and the other policy, wherein the instructions are to cause the processor to:
   receive a user input that indicates a preferred allowability based on the example of performance; and
   assign a higher priority to either the modified policy or the other policy based on the user input.

11. The non-transitory computer readable medium of claim 10, wherein
 in response to a determination that the comparison indicates that the modified policy or the other policy is redundant, the instructions are further to cause the processor to ensure that the redundant policy is deleted from the set.

12. The non-transitory computer readable medium of claim 11, wherein to ensure that either the modified policy or the other policy is deleted from the set, the instructions are further to cause the processor to automatically delete whichever of the modified policy and the other policy includes a condition that is less general.

13. The non-transitory computer readable medium of claim 10, wherein the input comprises an indication to add a policy to the set, to delete a policy from the set, or to edit a policy of the set.

14. The non-transitory computer readable medium of claim 10, wherein the requested action is selected from a group of actions consisting of: printing, saving, emailing, and uploading.

15. A system to modify a policy of a set of context-aware document policies, comprising:
 a processor and a memory, the memory comprising machine-readable instructions that when executed, cause the processor to:
  obtain input to modify a policy of a set of context-aware document policies, the policy of the set being applicable to a requested action on a document so as to indicate allowability of the requested action based at least on satisfaction of a condition of the policy that relates to a content of the document, and when a plurality of policies of the set are applicable to the requested action on the document, allowability of the requested action being determined by allowability that is indicated by application of the applicable policy with a highest priority;
  modify the policy based on the input and compare the modified policy with an other policy of the set;
  in response to a determination that the comparison indicates the modified policy and the other policy are applicable to a single requested action on a single document, automatically ensure that the set of policies remains self-consistent,
 wherein to ensure that the set of policies remains self-consistent includes to:
  automatically generate an example of performance of the single requested action on an example of a document; and
  in response to a determination that the comparison indicates mutually contradictory allowability, ensure that different priorities are assigned, wherein the processor is to:
   receive a user input that indicates a preferred allowability based on the example of performance; and
   assign a higher priority to either the modified policy or the other policy based on the user input.

16. The system of claim 15, wherein to generate the example of performance, the processor is to:
 automatically generate another document;
 apply the set of policies to the another document; and
 output the another document and an outcome of the application of the set of policies to the another document.

\* \* \* \* \*